United States Patent
Bauer et al.

(10) Patent No.: US 7,429,051 B2
(45) Date of Patent: Sep. 30, 2008

(54) PROCESS FOR COUPLING A TRAILER WITH THE USE OF A VEHICLE LEVEL REGULATION SYSTEM

(75) Inventors: Werner Bauer, Munich (DE); Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/507,502

(22) Filed: Aug. 22, 2006

(65) Prior Publication Data

US 2006/0293800 A1 Dec. 28, 2006

Related U.S. Application Data

(63) Continuation of application No. PCT/EP2005/001570, filed on Feb. 16, 2005.

(30) Foreign Application Priority Data

Feb. 24, 2004 (DE) ........................ 10 2004 008 928

(51) Int. Cl.
*B60S 9/00* (2006.01)

(52) U.S. Cl. .................. 280/6.15; 340/431; 340/435

(58) Field of Classification Search ............... 280/6.15, 280/6.153, 6.157, 5.514, 763.1; 340/431, 340/435
See application file for complete search history.

(56) References Cited

U.S. PATENT DOCUMENTS

| | | | | |
|---|---|---|---|---|
| 2,809,054 A | * | 10/1957 | Miller | 280/429 |
| 3,103,368 A | * | 9/1963 | Erickson | 280/6.151 |
| 4,150,840 A | * | 4/1979 | Banerjea et al. | 280/429 |
| 5,191,328 A | * | 3/1993 | Nelson | 340/870.06 |
| 5,650,764 A | | 7/1997 | McCullough | |
| 5,729,194 A | * | 3/1998 | Spears et al. | 340/431 |
| 5,915,700 A | * | 6/1999 | Schneider et al. | 280/6.153 |
| 6,222,457 B1 | * | 4/2001 | Mills et al. | 340/686.1 |
| 6,970,184 B2 | * | 11/2005 | Hirama et al. | 348/148 |
| 7,104,547 B2 | * | 9/2006 | Brookes et al. | 280/6.153 |
| 7,142,098 B2 | * | 11/2006 | Lang et al. | 340/431 |
| 7,151,443 B2 | * | 12/2006 | Dialinakis | 340/431 |

(Continued)

FOREIGN PATENT DOCUMENTS

DE    23 35 479 A1    1/1975

(Continued)

OTHER PUBLICATIONS

Chinese Office Action dated Dec. 21, 2007 with English translation (Twelve (12) pages).

*Primary Examiner*—Kevin Hurley
*Assistant Examiner*—Drew J. Brown
(74) *Attorney, Agent, or Firm*—Crowell & Moring LLP

(57) ABSTRACT

A driver assistance system is provided for coupling a trailer coupling mounted on a vehicle to a counterpiece mounted on a trailer. A control unit is provided in the vehicle, where, when a predefined first condition holds, the control unit controls at least one actuator of a vehicle level regulation system such that at least the back part of the vehicle is lowered and/or, when a predefined second condition holds, the control unit controls at least one actuator of a vehicle level regulation system such that at least the back part of the vehicle is raised.

12 Claims, 2 Drawing Sheets

U.S. PATENT DOCUMENTS

| | | | |
|---|---|---|---|
| 7,237,790 B2 * | 7/2007 | Gehring et al. | 280/477 |
| 2003/0067136 A1 * | 4/2003 | Scott et al. | 280/124.157 |
| 2003/0234512 A1 * | 12/2003 | Holub | 280/432 |

FOREIGN PATENT DOCUMENTS

| | | | |
|---|---|---|---|
| DE | 221 693 A1 | 5/1985 |
| DE | 41 35 795 A1 | 6/1993 |
| EP | 0 610 702 A2 | 8/1994 |
| EP | 1 249 365 A1 | 10/2002 |
| EP | 1 040 022 B1 | 8/2003 |
| GB | 2 387 582 A | 10/2003 |

* cited by examiner

PROCESS FOR COUPLING A TRAILER WITH THE USE OF A VEHICLE LEVEL REGULATION SYSTEM

CROSS-REFERENCE TO RELATED APPLICATIONS

This application is a continuation of PCT International Application No. PCT/EP2005/001570, filed on Feb. 16, 2005, which claims priority under 35 U.S.C. §119 to German Application No. 10 2004 008 928.0, filed Feb. 24, 2004, the entire disclosures of which are expressly incorporated by reference herein.

BACKGROUND AND SUMMARY OF THE INVENTION

The invention relates to a process for coupling a trailer coupling mounted on a vehicle to a counterpiece mounted on a trailer.

The coupling of a trailer to a vehicle is, as a rule, complicated and often afflicted with problems. In traditional vehicles, no direct view of the trailer coupling, such as a hitch, mounted on the vehicle is possible. Because of this, it is only with difficulty that the trailer coupling mounted on the vehicle can be placed precisely in proximity to the counterpiece mounted on the trailer when no persons, other than the driver, are present to offer assistance.

From EP 1 249 365 B1, a vehicle support system is known which is supposed to provide a remedy for the aforementioned problem. The vehicle support system described there includes the display of an image from a rear view camera on a display device on which certain automatically generated guide lines can be superimposed, if a predefined instruction input is received. From these guide lines the driver can see on the display device how she/he must steer the vehicle in order to place the trailer coupling mounted on the vehicle in proximity to the counterpiece mounted on a trailer.

However, actually bringing together the two parts of the trailer coupling continues to be a manual process.

According to the present state of the art, the bringing together of the two coupling parts can be done with the aid of a threaded support which, with the aid of a crank and the use of human muscular force, can lift up the trailer-side part of the coupling and let down the vehicle-side part of the coupling.

This is associated with an expenditure of force, a reduction in convenience, and a loss of time. A contemplated alternative is a motorized threaded device which, however, leads to a clear cost increase for the device.

The objective of the present invention is to specify a driver assistance system, which makes possible simple and rapid coupling of a trailer to a vehicle without great expenditure of force and without the help of other people.

This objective is realized according to the invention by a driver assistance system for coupling a trailer coupling mounted on a vehicle to a counterpiece mounted on a trailer, wherein a control unit is provided in the vehicle. When a predefined first condition holds, the control unit controls at least one actuator of a vehicle level regulation system in such a manner that at least the back part of the vehicle is lowered and/or, when a predefined second condition holds, the control unit controls at least one actuator of a vehicle level regulation system in such a manner that at least the back part of the vehicle is raised.

The driver assistance system according to the invention for coupling a trailer coupling mounted on a vehicle to a counterpiece mounted on a trailer is distinguished by the fact that a control unit is provided in the vehicle and, when a predefined first condition holds, the control unit controls at least one actuator of a vehicle level regulation system such that at least the back part of the vehicle is lowered and/or, when a predefined second condition holds, the control unit controls at least one actuator of a vehicle level regulation system in such that at least the back part of the vehicle is raised.

A driver assistance system of this type offers the advantage of coupling a trailer to a vehicle without great effort. Trailers can, for example, be campers or trailers which serve to transport heavy goods, unwieldy goods such as boats, or animals. The control device which controls the actuators of the vehicle level regulation system can, for reasons of cost and/or space, be combined with a control device already present in the vehicle or can be implemented (possibly even retroactively) as a pure software function in one or more pre-existing control devices. Since a vehicle level regulation system is already present in many vehicles, no additional costs for these actuators arise for the driver assistance system according to the invention. Depending on how the actuators of the vehicle level regulation system are configured, or how the vehicle level regulation system itself is configured, either only the back part of the vehicle or the entire vehicle is lowered or raised when the predefined first condition or the predefined second condition holds.

The lowering or raising is done to an appropriate height. Through the lowering, the coupling on the vehicle side can be placed under the counterpiece on the trailer side without the latter first having to be raised. The vehicle level regulation system can also be understood to mean a controllable air suspension system or a stabilization system for driving around curves.

Advantageously, the predefined first condition holds if, as detected by use of the sensor unit, the distance between the trailer coupling mounted on the vehicle and the counterpiece mounted on the trailer falls below a predefined distance value and/or if the trailer coupling mounted on the vehicle can be driven together with the counterpiece mounted on the trailer without alignment, and/or if the vehicle level regulation system operating element provided for this is actuated.

Here, "without further alignment" means that the vehicle is already positioned so that the steering angle, but no longer the direction of travel (forwards or backwards) is changed.

Advantageously, the sensor unit serves for the automatic recognition of at least the counterpiece mounted on the trailer for the determination of its position relative to, and/or its distance from, the coupling on the vehicle side. The sensor unit can be based on an optical, ultrasonically based, capacitive, or inductive sensor, contain a combination of these sensors, or can be based on a radar or lidar device, etc.

Here, the optical sensors can also be understood to mean a sensor system based on the TOF (Time of Flight) principle. As a condition for lowering at least the back part of the vehicle, the determination of the relative position of, and/or the distance between, the two parts of the trailer coupling is advantageous in the sense of ensuring, with a high probability, that the driver of the vehicle intends to couple the trailer. The sensor unit also comprises the corresponding data evaluation system. This can be realized so as to be spatially separated from the sensors in a separate control device or another pre-existing control device.

For a simplified automatic recognition of the coupling parts, they can, for example, bear a special marking. The marking can have a special color, texture, or wave reflection properties.

Instead of the automatic sensing/object recognition however, a single vehicle level regulation system operating element provided for this purpose can also be actuated for the activation of the coupling process. Instead of the single vehicle level regulation system operating element provided for this, a key or switch, which is already present in any case, can be assigned a dual function. Thus, with absolute certainty the vehicle is only lowered if the driver wishes that to be the case.

Advantageously, the sensor unit is formed as an extension of an assistance system for perceiving the surroundings or reproducing images. This can advantageously be a rear view camera system and/or a Park Distance Control system (PDC). For this, for example, the image evaluation system can be formed in a pre-existing rear view camera system, for example, in such a manner that, in a first step, it recognizes, by use of an automatic object recognition unit, the trailer coupling mounted on the vehicle and the counterpiece mounted on the trailer and automatically calculates, from the image data, their relative position, or only the distance between them. The automatic object recognition unit can be configured in such a manner that, even when the trailer coupling mounted on the vehicle is replaced, it can be recognized distinctly. An assistance system for perceiving the surroundings can, for example, also be understood to mean an optical, radar-based, or lidar-based guidance assistance system or a pre-crash sensor unit.

Advantageously, the sensor unit is connected to a display device which is mounted at a location which can be seen from the driver's seat and which displays, as a geometrically transformed video image or in symbolic form, the position of the trailer coupling mounted on the vehicle relative to the position of the counterpiece mounted on the trailer.

In this way, the driver has the capability, by use of the display device and in a simple manner, of placing the trailer coupling mounted on the vehicle directly at the counterpiece mounted on the trailer. If both coupling parts are positioned sufficiently favorably with respect to one another, it can be automatically communicated to the driver that she/he should allow, by actuation of an operating element, at least the back part of the vehicle to lower. The operating element can also be formed as a part of a multifunctional operating element or a speech or gesture recognition system. The display device can be formed as a head-up display. The representation can be a symbolic representation of the two coupling parts and/or a representation of a geometrically transformed camera image. A geometric transformation of the image can be understood to mean a virtual change of the camera perspective, and/or electronic equalization, and/or an enlargement or deformation of certain regions of the image. The representation can also be done in such a manner that it communicates to the driver a three-dimensional impression of the scene.

Advantageously, for reasons of convenience, design, or cost, guide lines for alignment and/or guide symbols and/or a Soft Key, as a vehicle level regulation system operating element, are represented on the display device.

If the distance between the trailer coupling mounted on the vehicle and the counterpiece mounted on the trailer falls below a predefined limit value and/or the relative position of the two coupling parts indicates an imminent coupling process, the vehicle level regulation system operating element appears on the display device as a Soft Key. In this way, it is communicated to the driver that she/he should now initiate or confirm, by the actuation of the operating element, the lowering of at least the back part of her/his vehicle in order to place the trailer coupling mounted on the vehicle under the counterpiece mounted on the trailer. The extension according to the invention and by the display of alignment symbols is also very advantageous.

Symbols can represent at least one recommended steering direction for driving together the two coupling parts and/or a numerical display of the distance between the two coupling parts. If, for example, the trailer coupling mounted on the vehicle and the counterpiece mounted on the trailer are automatically recognized by the sensor unit, the relative position of the two components (trailer coupling and counterpiece) can be represented schematically on the display device, whereby placing the trailer coupling mounted on the vehicle as conveniently as possible, and precisely at or under the counterpiece on the trailer side, will be simplified for the driver. Alignment symbols can also be lines which, for example, are superimposed as optimally calculated driving lines and symbolically represented recommended steering processes.

Advantageously, when the predefined first condition holds, the control unit controls, as a function of the position of the trailer coupling mounted on the vehicle relative to the counterpiece mounted on the trailer, said position being detected by the sensor unit, a steering system, and/or a drive unit, and/or a brake unit of the vehicle, in such a manner that the trailer coupling mounted on the vehicle is placed under the counterpiece mounted on the trailer. Here, it can be logical for reasons of safety and/or the law to have the automatic execution of the described automatic actions confirmed, e.g., in several steps, e.g., by actuating an operating element. Thus, there is the possibility of placing the trailer coupling mounted on the vehicle directly under the counterpiece mounted on the trailer in a partly, or completely, automatic manner.

The predefined second condition advantageously holds, if the trailer coupling present on the vehicle and detected by means of the sensor unit is placed under the counterpiece present on the trailer and/or if a vehicle level regulation system operating element is actuated. With this, the necessity of manual lowering of the coupling on the trailer side to the coupling on the vehicle side, as is common at present, can be omitted. The vehicle level regulation system operating element for raising may be the same operating element as for lowering.

The sequence of vehicle operations, with respect to the trailer and according to the invention, for coupling the trailer was subdivided in this description schematically into several steps (driving up, lowering the vehicle level, driving under the coupling on the trailer side, raising the vehicle level). In the driver assistance system according to the invention, the coupling of a trailer can also occur in a single continuous motion which is composed by superimposing at least two of the motions to be carried out according to the invention, without departing from the spirit of the claims.

Advantageously, after carrying out one or more of the process steps described above, the back part of the vehicle is raised such that the counterpiece mounted on the trailer is raised with it in such that a device supporting the trailer in the parked state is folded in automatically.

The supporting device can, for example, be equipped with a spring, which is in a stressed position when it supports the trailer. If the weight of the trailer shifts so that weight no longer bears on the supporting device, the spring contracts and the supporting device is automatically folded upwards.

Other objects, advantages and novel features of the present invention will become apparent from the following detailed description of the invention when considered in conjunction with the accompanying drawings.

DETAILED DESCRIPTION OF THE DRAWINGS

Figure 1:
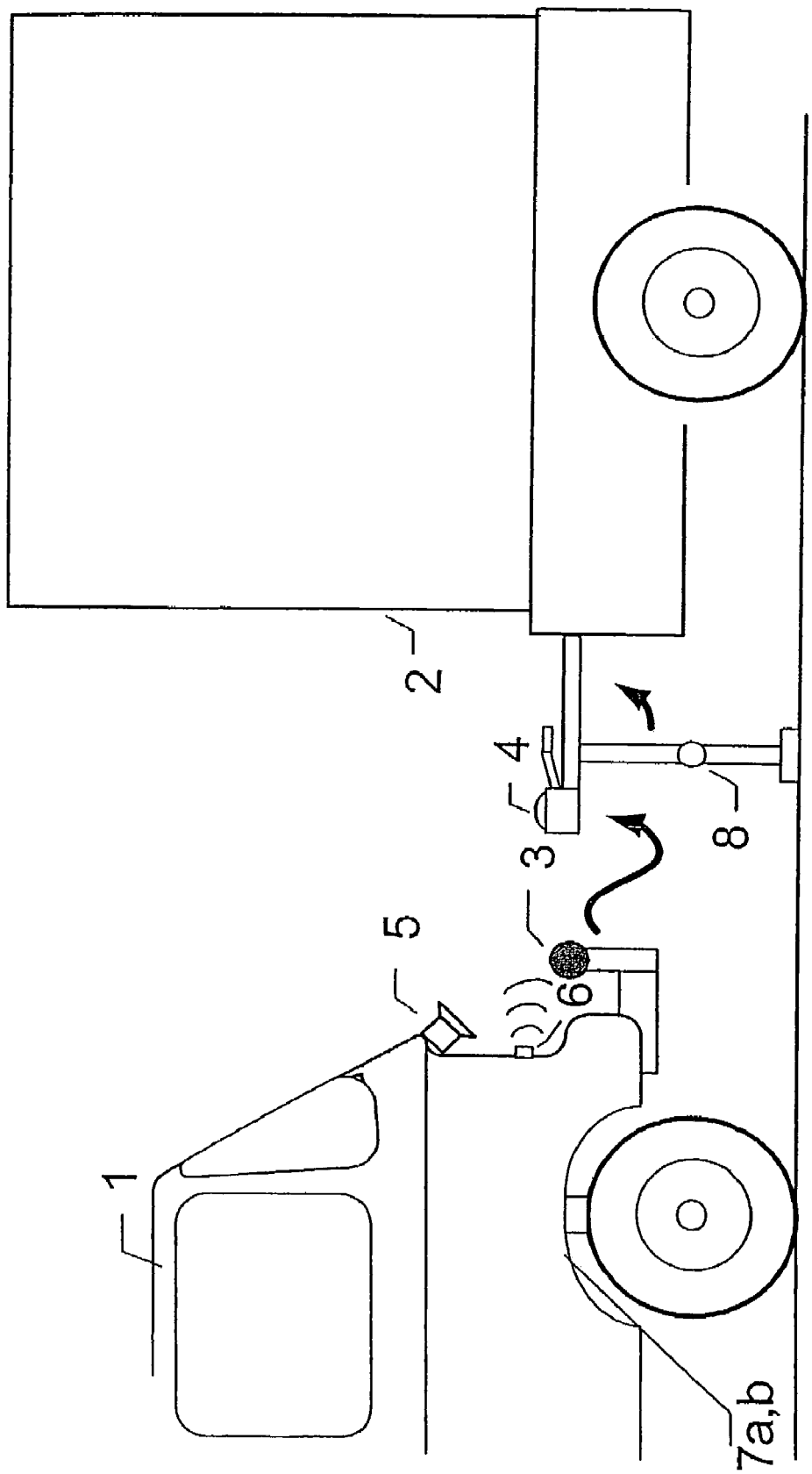
FIG. 1 schematically illustrates a vehicle with a trailer coupling mounted on the vehicle and a trailer with a counterpiece mounted on the trailer.

FIG. 1 shows a vehicle 1 on which a rear view camera 5 as an optical sensor, an ultrasonic sensor 6, and a trailer coupling 3, are mounted. On a trailer 2 a counterpiece 4 for the trailer coupling 3 is mounted and is supported by a device 8 supporting the trailer without a crank device.

Figure 2:
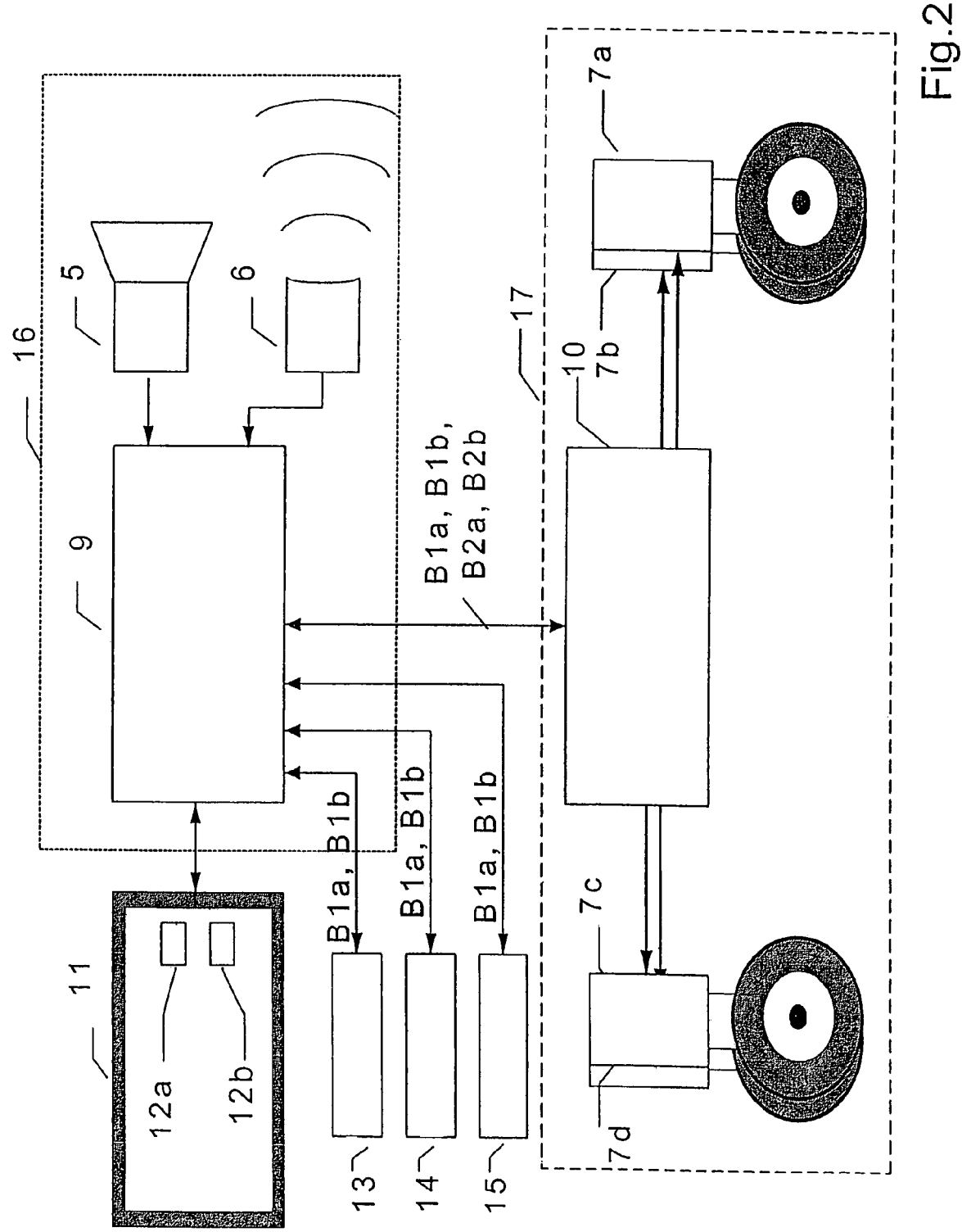
FIG. 2 is an embodiment example of the driver assistance system according to the invention.

FIG. 2 is a block diagram of an embodiment example of the driver assistance system according to the invention. Components which are identical in FIG. 1 and FIG. 2 are given the same reference numbers.

Actuators 7a to 7d of a vehicle level regulation system 17 are controlled by a control unit 9. The vehicle level regulation system has, in turn, its own control device 10, in which the control unit of the driver assistance system according to the invention may also be contained.

The driver assistance system represented schematically as an example includes at least one rear view camera 5 as an optical sensor and/or one or more ultrasonic sensors 6. The rear view camera 5 and the ultrasonic sensor 6 are connected to the control unit 9 which is formed here, for example, as a part of the rear view camera system. For reasons of cost, the sensor unit can, for example, be only based on the rear camera system.

The sensor unit 16 has the control unit 9, which in this example as noted above is realized as part of the control device of the rear view camera system. The control unit can, however, also merely be a software function which is implemented in a control device already present in the vehicle.

Furthermore, the system includes a display unit 11 with a vehicle level regulation system operating element 12, which can be configured in the form of two operating elements 12a and 12b for lowering or raising at least the back part of the vehicle 1, as a part of a multifunctional operating element, or as a speech or gesture recognition system. The actuators 7a to 7d of a vehicle level regulation system 17 are controlled by the control device 10 of the vehicle level regulation system 17.

The driver assistance system according to the invention for coupling a trailer coupling 3 mounted on a vehicle 1 to a counterpiece 4 mounted on the trailer 2 is distinguished by the fact that a control unit 9 is provided in the vehicle 1 and, when a predefined first condition B1a or B1b holds, at least one actuator of the actuators 7a to 7d of a vehicle level regulation system 17 is controlled in such a manner that at least the back part of the vehicle 1 is lowered, and/or when a predefined second condition B2a or B2b holds, at least one actuator of the actuators 7a to 7d of the vehicle level regulation system 17 is controlled in such a manner that at least the back part of the vehicle 1 is raised.

The predefined first condition holds if, as detected by use of the sensor unit 16, the distance between the trailer coupling 3 mounted on the vehicle 1 and the counterpiece 4 mounted on the trailer 2 falls below at least one predefined distance value and/or if the trailer coupling 3 mounted on the vehicle 1 can be driven together with the counterpiece 4 mounted on the trailer 2 without alignment (B1a), and/or if the vehicle level regulation system operating element 12a or 12b provided for this (in this figure as a Soft Key superimposed on the image from the rear camera) is actuated (B1b).

As already mentioned, the sensor unit 16 is connected to the display device 11, which is mounted at a location which can be seen from the driver's seat and displays the position of the trailer coupling 3 mounted on the vehicle 1 relative to the position of the counterpiece 4 mounted on the trailer 2. The vehicle level regulation system operating element 12a or 12b is mounted within reach of the driver and, upon actuation of the vehicle level regulation system operating element, the control unit controls at least one of the actuators 7a to 7d of a vehicle level regulation system 17 in such a manner that at least the back part of the vehicle 1 is lowered. The vehicle level regulation system operating element 12a or 12b is formed as a Soft Key on the display device 11. The display represented on the display device 11 is enhanced by a comprehensible symbolic representation of the automatically generated suggestions for alignment, e.g., in the form of arrows.

The driver assistance system can, in a particular development possibility, be adjusted, by use of an operating element not represented here, such that, when the predefined first condition B1a or B1b holds, the control unit 9 controls, as a function of the position of the trailer coupling 3 mounted on the vehicle 1 relative to the counterpiece 4 mounted on the trailer 2—the position being detected by the sensor unit 16—a steering system 13, and/or a drive unit 14, and/or a brake unit 15 of the vehicle 1 in such a manner that the trailer coupling 3 mounted on the vehicle 1 is placed under the counterpiece 4 mounted on the trailer 2 in a completely automatic, or partly automatic, manner.

When the vehicle 1 is lowered and the predefined second condition B2a or B2b holds, the control unit 9 controls at least one of the actuators 7a to 7b of a vehicle level regulation system 17 such that at least the back part of the vehicle 1 is raised. The predefined second condition holds, if the trailer coupling 3 present on the vehicle 1 and detected by use of the sensor unit 16 is placed under the counterpiece 4 present on the trailer 2 (B2a) and/or if a vehicle level regulation system operating element is actuated (B2b).

A plurality of additional details can be configured in a thoroughly different manner from the above description without departing from the spirit of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system for coupling a trailer coupling mounted on a vehicle to a counterpiece mounted on a trailer, the driver assistance system comprising:
    a control unit provided in the vehicle;
    a vehicle level regulation system coupled with the control unit, the vehicle level regulation system including at least one actuator for raising or lowering a back part of the vehicle; and
    a sensor unit for sensing at least the counterpiece,
    the driver assistance system being operatively configured such that when a predefined first condition holds, the control unit controls the at least one actuator such that at least the back part of the vehicle is lowered and/or when a predefined second condition holds, the control unit controls the at least one actuator such that at least the back part of the vehicle is raised, wherein the predefined first condition holds if, as detected by the sensor unit, at least one of:
a distance between the trailer coupling mounted on the vehicle and the counterpiece mounted on the trailer falls below a predefined distance value,
the trailer coupling mounted on the vehicle is drivable together with the counterpiece mounted on the trailer without alignment, and
an operating element of the vehicle level regulation system is actuated.

2. The driver assistance system according to claim 1, wherein the sensor unit comprises at least one of an optical, ultrasonic, capacitive, inductive, radar, and lidar sensor for detecting the distance between the trailer coupling mounted on the vehicle and the counterpiece mounted on the trailer.

3. The driver assistance system according to claim 2, wherein the sensor unit is formed as an extension of an assistance system for perceiving the surroundings or reproducing images.

4. The driver assistance system according to claim 3, wherein the assistance system covering the surroundings is at least one of a rear view camera system and a park distance control system.

5. The driver assistance system according to claim 1, wherein the sensor unit is connected to a display device which is mounted at a location visible from a driver's seat and which displays, as a geometrically transformed video image or in symbolic form, a position of the trailer coupling mounted on the vehicle relative to the position of the counterpiece mounted on the trailer.

6. The driver assistance system according to claim 5, wherein at least one of guide symbols and a Soft Key, as the vehicle level regulation system operating element, are represented on the display device.

7. The driver assistance system according to claim 1, wherein, when the predefined first condition holds, the control unit controls, as a function of the position of the trailer coupling mounted on the vehicle relative to the counterpiece mounted on the trailer, said position being detected by the sensor unit, at least one of a steering system, a drive unit, and a brake unit, of the vehicle such that the trailer coupling mounted on the vehicle is placed under the counterpiece mounted on the trailer.

8. The driver assistance system according to claim 1, wherein, the second condition holds when, by use of the sensor unit, the trailer coupling mounted on the vehicle is placed under the counterpiece mounted on the trailer and/or when an operating element is actuated.

9. The driver assistance system according to claim 1, wherein the back part of the vehicle is raised in such a manner that the counterpiece mounted on the trailer is raised with it in such a manner that a device supporting the trailer in a parked state is folded in automatically.

10. A method of assisting a driver and coupling a trailer coupling mounted on a vehicle to a counterpiece mounted on a trailer, the method comprising the acts of:
determining whether a predefined first condition exists;
upon the existence of the predefined first condition, controlling at least one actuator of a vehicle level regulation system such that a back part of the vehicle is lowered;
determining whether a predefined second condition exists; and
when the predefined second condition exists, controlling at least one actuator of the vehicle level regulation system such that at least the back part of the vehicle is raised, wherein
the act of determining whether the predefined first condition exists, further comprises at least one of:
detecting via a sensor unit whether a distance between the trailer coupling mounted on the vehicle and the counterpiece mounted on the trailer falls below a predefined distance value;
determining with the sensor unit if the trailer coupling mounted on the vehicle is drivable together with the counterpiece mounted on the trailer without alignment; and
determining an actuation of an operating element of the vehicle level regulation system provided in accordance with an output of the sensor unit.

11. The method according to claim 10, wherein when the predefined first condition exists, further comprising the act of controlling, as a function of the position of the trailer coupling mounted on the vehicle relative to the counterpiece mounted on the trailer, at least one of a steering system, a drive unit, and a brake unit, of the vehicle such that the trailer coupling mounted on the vehicle is placed under the counterpiece mounted on the trailer.

12. The method according to claim 10, wherein at least one of the steering system, drive unit, and brake unit are controlled by a control unit provided in the vehicle.

* * * * *